United States Patent
Yoshida et al.

(10) Patent No.: US 10,781,704 B2
(45) Date of Patent: Sep. 22, 2020

(54) TURBINE AND TURBOCHARGE

(71) Applicant: MITSUBISHI HEAVY INDUSTRIES ENGINE & TURBOCHARGER, LTD., Sagamihara-shi, Kanagawa (JP)

(72) Inventors: Toyotaka Yoshida, Tokyo (JP); Makoto Ozaki, Sagamihara (JP); Takao Yokoyama, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 80 days.

(21) Appl. No.: 16/314,587

(22) PCT Filed: Dec. 28, 2016

(86) PCT No.: PCT/JP2016/089175
§ 371 (c)(1),
(2) Date: Dec. 31, 2018

(87) PCT Pub. No.: WO2018/123045
PCT Pub. Date: Jul. 5, 2018

(65) Prior Publication Data
US 2019/0323368 A1 Oct. 24, 2019

(51) Int. Cl.
*F01D 9/02* (2006.01)
*F02B 39/00* (2006.01)

(52) U.S. Cl.
CPC ............. *F01D 9/026* (2013.01); *F02B 39/00* (2013.01)

(58) Field of Classification Search
CPC .......... F01D 5/043; F01D 9/026; F01D 25/24; F02C 6/12; F02B 37/00; F02B 39/00; F05D 2220/40
See application file for complete search history.

(56) References Cited

U.S. PATENT DOCUMENTS 6,142,732 A 11/2000 Chou et al.
8,226,358 B2 * 7/2012 Matsuo ................. F02B 37/025
415/151

(Continued)

FOREIGN PATENT DOCUMENTS

CN 105940204 A 9/2016
EP 2096264 A2 9/2009

(Continued)

OTHER PUBLICATIONS

International Preliminary Report on Patentability and English translation of the Written Opinion of the International Searching Authority for International Application No. PCT/JP2016/089175, dated Jul. 11, 2019.

(Continued)

*Primary Examiner* — Igor Kershteyn
(74) *Attorney, Agent, or Firm* — Birch, Stewart, Kolasch & Birch, LLP.

(57) ABSTRACT

When A is a flow-path cross-sectional area of the scroll part, and R is a distance from a centroid of a flow-path cross-section of the scroll part to a rotational axis of the turbine rotor blade, the scroll part is configured so that a first graph, having a horizontal axis representing an angular position θ in a circumferential direction of the scroll part and a vertical axis representing ratio A/R of the flow-path cross-sectional area A to the distance R, at least partially has a concave distribution. The scroll part includes a first section belonging to a first angular range in the circumferential direction, and a second section belonging to a second angular range downstream of the first angular range in the circumferential direction and having a smaller throat width than a throat width of the first section in an axial direction of the turbine rotor blade.

5 Claims, 8 Drawing Sheets

(56) References Cited

U.S. PATENT DOCUMENTS

| | | | | |
|---|---|---|---|---|
| 2009/0007564 | A1* | 1/2009 | Suzuki | F02B 37/22 60/602 |
| 2010/0074744 | A1* | 3/2010 | Phillips, Jr. | F02C 6/12 415/208.1 |
| 2011/0232282 | A1* | 9/2011 | Anschel | F01D 9/026 60/615 |
| 2011/0243721 | A1* | 10/2011 | Alajbegovic | F01D 17/167 415/204 |
| 2012/0051899 | A1 | 3/2012 | Petitjean et al. | |
| 2013/0052054 | A1* | 2/2013 | Loringer | F01D 9/026 417/406 |
| 2013/0219885 | A1* | 8/2013 | Watson | F04D 1/00 60/605.1 |
| 2013/0266433 | A1* | 10/2013 | Yokoyama | F01D 9/026 415/205 |
| 2014/0003910 | A1* | 1/2014 | Brinkert | F01D 9/026 415/71 |
| 2016/0319683 | A1* | 11/2016 | Yokoyama | F01D 25/24 |

FOREIGN PATENT DOCUMENTS

| | | |
|---|---|---|
| EP | 2796664 A1 | 10/2014 |
| EP | 3088700 A1 | 11/2016 |
| JP | 53-136113 A | 11/1978 |
| JP | 63-34328 U | 3/1988 |
| JP | 2000-45784 A | 2/2000 |
| JP | 2011-231780 A | 11/2011 |
| JP | 2015-124743 A | 7/2015 |
| JP | 2015-183670 A | 10/2015 |
| JP | 5870083 B2 | 2/2016 |
| JP | 2016-132996 A | 7/2016 |

OTHER PUBLICATIONS

International Search Report for International Application No. PCT/JP2016/089175 dated Apr. 4, 2017.
Japanese Notice of Reasons for Refusal dated May 21, 2019, for Japanese Patent Application No. 2018-532478, with English translation.
Extended European Search Report for European Application No. 16925270.7, dated Jan. 14, 2020.
Office Action dated Jun. 2, 2020 issued in counterpart Chinese Application No. 201680087870.4.

* cited by examiner

TURBINE AND TURBOCHARGE

TECHNICAL FIELD

The present disclosure relates a turbine and a turbocharger.

BACKGROUND ART

A housing for a turbine used in a turbocharger or the like includes a scroll part. The scroll part extends along a circumferential direction of a turbine rotor blade so as to surround the turbine rotor blade. The scroll part is shaped so that a fluid flowing into an inlet of the scroll part collides with the turbine rotor blade uniformly over the entire circumference of the turbine rotor blade. More specifically, when A is a flow-path cross-sectional area of the scroll part, and R is a distance from a centroid (center of gravity) of a flow-path cross-section of the scroll part to an axis of the turbine rotor blade, the scroll part is configured so that a ratio A/R of the flow-path cross-sectional area A to the distance R decreases from the inlet of the scroll part toward the terminating end of the scroll part.

Further, the scroll part of a typical turbine is designed without considering exhaust pulsation. The reason is that the influence of exhaust pulsation is considered ignorable because it has a long period, as well as it is difficult to design the turbine considering exhaust pulsation because such a design needs to evaluate an unsteady flow in the turbine.

On the other hand, Patent Document 1 suggests a turbine capable of improving turbine efficiency by designing the scroll part of the turbine, considering exhaust pulsation. The scroll part of the turbine disclosed in Patent Document 1 is configured so that the ratio A/R at least partially has a concave distribution in a graph with the horizontal axis representing a circumferential position around the axis of the turbine rotor blade and the vertical axis representing the ratio A/R.

CITATION LIST

Patent Literature

Patent Document 1: JP5870083B

SUMMARY

Problems to be Solved

At least one embodiment of the present invention is improved over the prior art disclosed in Patent Document 1. An object thereof is to provide a turbine with high efficiency and a turbocharger including the same, considering exhaust pulsation.

Solution to the Problems (1) A turbine according to at least one embodiment of the present invention comprises: a turbine rotor blade; and a turbine housing accommodating the turbine rotor blade; the turbine housing including a shroud part accommodating the turbine rotor blade, a scroll part formed on a radially outer side of the turbine rotor blade, and a communication part connecting the scroll part and the shroud part, wherein when A is a flow-path cross-sectional area of the scroll part, and R is a distance from a centroid of a flow-path cross-section of the scroll part to a rotational axis of the turbine rotor blade, the scroll part is configured so that a first graph at least partially has a concave distribution, the first graph having a horizontal axis representing an angular position $\theta$ in a circumferential direction of the scroll part and a vertical axis representing a ratio A/R of the flow-path cross-sectional area A to the distance R, and wherein the scroll part includes a first section belonging to a first angular range in the circumferential direction, and a second section belonging to a second angular range downstream of the first angular range in the circumferential direction, the second section having a smaller throat width than a throat width of the first section in an axial direction of the turbine rotor blade.

The magnitude of a flow velocity vector of a scroll flow from the scroll part is changed by exhaust pulsation. More specifically, the flow velocity vector of the scroll flow increases when the inlet pressure of the turbine rotor blade is temporarily increased by exhaust pulsation; and the flow velocity vector of the scroll flow decreases when the inlet pressure of the turbine rotor blade is temporarily decreased by exhaust pulsation. Accordingly, a relative velocity vector of the scroll flow with respect to the turbine rotor blade at the inlet of the turbine rotor blade is also changed by exhaust pulsation.

On the other hand, the flow-path cross-sectional area A of the scroll part decreases downstream. Thus, a wet area per unit flow rate in the flow-path cross-section of the scroll part (a contact area between exhaust gas and a flow path wall surface of the scroll part 36 per unit flow rate) increases downstream. Therefore, it is preferable to collect energy at the inlet side, where exhaust gas has large energy, as much as possible in the scroll part in terms of efficiency.

In view of this, in the turbine described in the above (1), the scroll part is configured so that the first graph at least partially has a concave distribution to effectively collect energy of the scroll flow temporarily increased by exhaust pulsation at the inlet side of the scroll part, considering the change in magnitude of energy of exhaust gas due to pulsation.

With this configuration, an absolute value $|d(A/R)/d\theta|$ of a slope of the first graph at the inlet side of the scroll part is made larger than an absolute value $|d(A/R)/d\theta|$ of a slope of the first graph at the terminating end side of the scroll part. Thus, a flow angle of the scroll flow (an angle of the scroll flow with respect to the circumferential direction) at the inlet side of the scroll part can be easily made larger than a flow angle of the scroll flow at the terminating end side of the scroll part. That is, a flow angle of the blade inlet flow (an angle of the blade inlet flow with respect to the radial direction) at the inlet side of the scroll part can be easily made larger than a flow angle of the blade inlet flow at the terminating end side of the scroll part.

Consequently, the scroll part can be configured so that the flow angle of the blade inlet flow at the inlet side of the scroll part matches or approximates to an optimum flow angle when the inlet pressure of the turbine rotor blade is temporarily increased by exhaust pulsation. Thus, it is possible to effectively collect energy of the scroll flow temporarily increased by exhaust pulsation at the inlet side of the scroll part, and it is possible to achieve the turbine with high efficiency considering exhaust pulsation.

In this case, however, if the throat width of the scroll part in the axial direction is unintentionally set constant regardless of the circumferential position, the flow angle of the blade inlet flow is significantly deviated from the optimum flow angle at the terminating end side of the scroll part when the inlet pressure of the turbine rotor blade is temporarily increased by exhaust pulsation.

In view of this, the turbine described in the above (1) is configured so as to increase energy that can be collected at the terminating end side of the scroll part; i.e. the scroll part includes a first section belonging to a first angular range in the circumferential direction and a second section belonging to a second angular range downstream of the first angular range in the circumferential direction, and the second section has a smaller throat width than a throat width of the first section in the axial direction.

According to findings of the present inventors, the flow angle $\alpha$ of scroll flow is represented by the following expression (a):

$$\alpha = \tan^{-1}\left|\frac{d(A/R)}{d\theta \times b}\right| \qquad (a)$$

wherein b is the throat width of the scroll part 36 in the axial direction.

Thus, even if the scroll part is configured so that the first graph at least partially has a concave distribution as described above, it is possible to reduce a reduction in flow angle $\alpha$ of the scroll flow in the second section by decreasing the throat width in the second section at the terminating end side of the scroll part. Accordingly, even in the second section at the terminating end side of the scroll part, the scroll part can be configured so that the flow angle of the blade inlet flow matches or approximates to the optimum flow angle when the inlet pressure of the turbine rotor blade is temporarily increased by exhaust pulsation. Thus, it is possible to achieve the turbine with high efficiency considering exhaust pulsation.

(2) In some embodiments, in the turbine described in the above (1), the scroll part has a minimum throat width in the axial direction at an angular position downstream of an angular position $\theta_{AVE1}$ in the circumferential direction, where the angular position $\theta_{AVE1}$ is plotted in a second graph, having a horizontal axis representing an angular position $\theta$ in the circumferential direction of the scroll part and a vertical axis representing an absolute value $|d(A/R)/d\theta|$ of a slope of the first graph, against an average of a maximum value and a minimum value of the absolute value $|d(A/R)/d\theta|$.

With the turbine described in the above (2), it is possible to set an appropriate flow angle of the scroll flow on the downstream side of the angular position $\theta_{AVE1}$ in the scroll part, considering exhaust pulsation. Thus, it is possible to achieve the turbine with higher efficiency.

(3) In some embodiments, in the turbine described in the above (1) or (2), the scroll part has a minimum throat width in the axial direction at an angular position downstream of an angular position $\theta_{AVE2}$ in the circumferential direction, where the angular position $\theta_{AVE2}$ is plotted in a second graph, having a horizontal axis representing an angular position $\theta$ in the circumferential direction of the scroll part and a vertical axis representing an absolute value $|d(A/R)/d\theta|$ of a slope of the first graph, against an average of the absolute value $|d(A/R)/d\theta|$ of the slope of the first graph at the angular position $\theta$ of 0° and the absolute value $|d(A/R)/d\theta|$ of the slope of the first graph at the angular position of 360°.

With the turbine described in the above (3), it is possible to set an appropriate flow angle of the scroll part on the downstream side of the angular position $\theta_{AVE2}$ in the scroll part, considering exhaust pulsation. Thus, it is possible to achieve the turbine with higher efficiency.

(4) In some embodiments, in the turbine described in any one of the above (1) to (3), the scroll part includes a section configured to decrease a throat width in the axial direction toward a downstream side in the circumferential direction.

With the turbine described in the above (4), it is possible to set an appropriate flow angle of the scroll flow without forming a step on a flow path wall surface of the scroll part, considering exhaust pulsation. Thus, it is possible to achieve the turbine with higher efficiency.

(5) A turbocharger according to at least one embodiment of the present invention comprises a turbine described in any one of the above (1) to (4).

With the turbocharger described in the above (5), since the turbine described in any one of the above (1) to (4) is included, it is possible to achieve the turbocharger with high efficiency considering exhaust pulsation.

Advantageous Effects

At least one embodiment of the present invention provides a turbine with high efficiency and a turbocharger including the same, considering exhaust pulsation.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
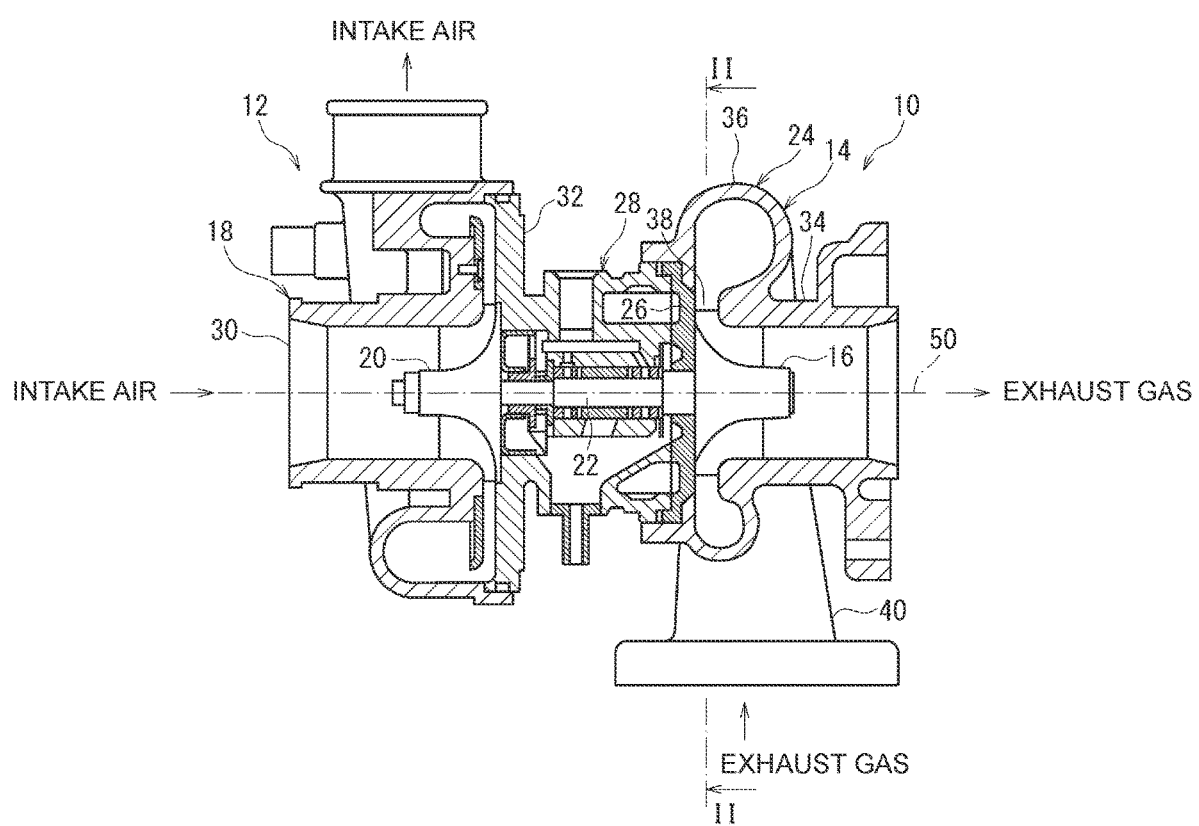
FIG. 1 is a vertical cross-sectional view schematically showing a turbocharger according to some embodiments of the present invention.

FIG. 1 is a vertical cross-sectional view schematically showing a turbocharger according to some embodiments of the present invention. The turbocharger is, for instance, applied to a vehicle, a ship, or the like.

The turbocharger includes a turbine 10 and a compressor 12. The turbine 10 includes a turbine housing 14, a turbine rotor blade (turbine impeller) 16 accommodated in the turbine housing 14. The compressor 12 includes a compressor housing 18 and an impeller 20 accommodated in the compressor housing 18.

The turbine rotor blade 16 of the turbine 10 and the impeller 20 of the compressor 12 are coupled to each other by a shaft 22. The turbine rotor blade 16 of the turbine 10 is rotated by exhaust gas discharged from an internal combustion engine, for instance, whereby the impeller 20 of the compressor 12 is rotated via the shaft 22. Rotation of the impeller 20 of the compressor 12 compresses intake air to be supplied to the internal combustion engine.

For instance, the turbine housing 14 includes a turbine casing 24 and an end wall 26 coupled to the turbine casing 24. The shaft 22 is inserted through the end wall 26. The end wall 26 is interposed between the turbine casing 24 and a bearing housing 28. The bearing housing 28 supports the shaft 22 rotatably via a bearing.

Furthermore, for instance, the compressor housing 18 includes a compressor casing 30 and an end wall 32 joined to the compressor casing 30. The shaft 22 is inserted through the end wall 32. The end wall 32 is formed integrally with the bearing housing 28.

The turbine housing 14 includes a cylindrical shroud part 34 which houses the turbine rotor blade 16 so as to face the blade tip of the turbine rotor blade 16, a scroll part (volute part) 36 formed on the radially outer side of the turbine rotor blade 16 and extending along the circumferential direction of the turbine rotor blade 16, and a communication part 38 connecting the shroud part 34 and the scroll part 36. In some embodiments, the turbine housing 14 includes an inlet part 40 for a fluid continuing to the scroll part 36. The outlet of the fluid is formed by the shroud part 34.

Figure 2:
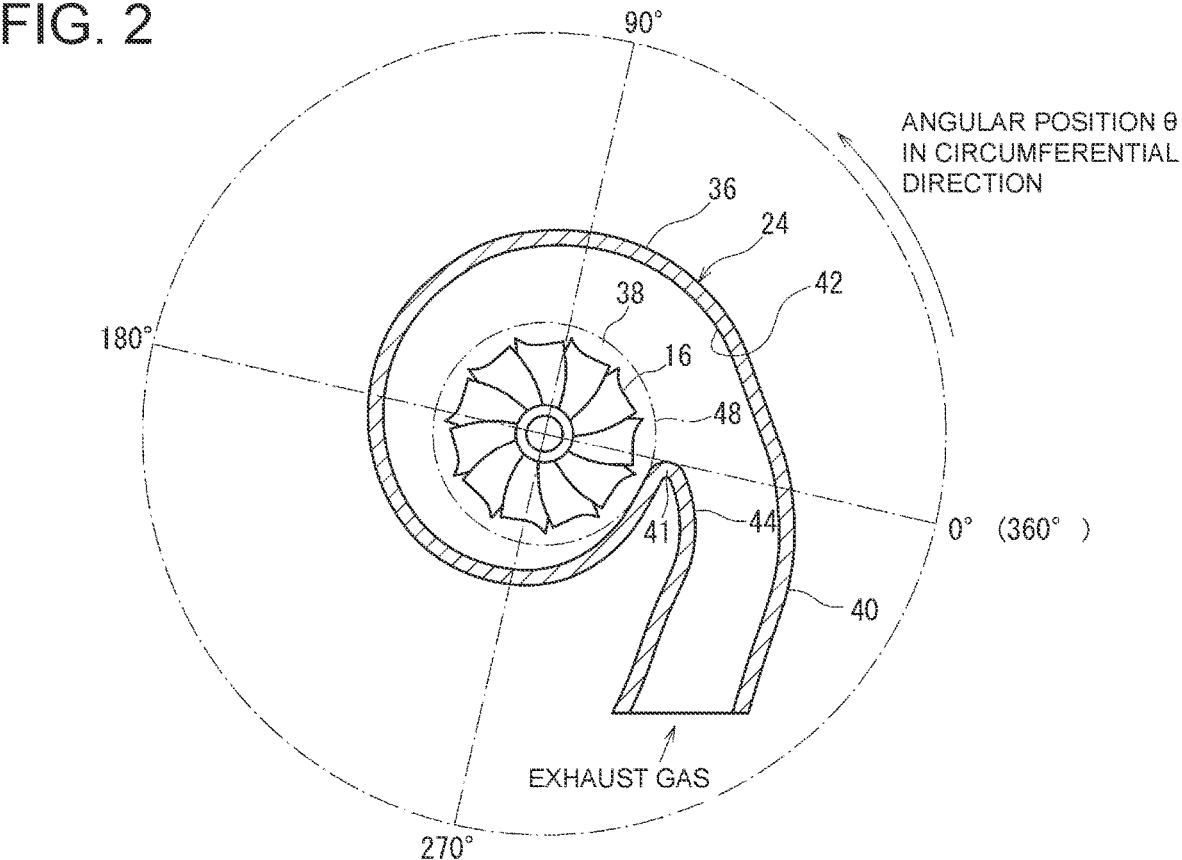
FIG. 2 is a schematic cross-sectional view taken along line II-II in FIG. 1.

FIG. 2 is a schematic cross-sectional view taken along line II-II in FIG. 1. Hereinafter, unless otherwise stated, the circumferential direction of the scroll part 36 (the circumferential direction of the turbine rotor blade 16) is simply referred to as a "circumferential direction"; the radial direction of the scroll part 36 (the radial direction of the turbine rotor blade 16) is simply referred to as a "radial direction"; and the axial direction of the scroll part 36 (the axial direction of the turbine rotor blade 16) is simply referred to as an "axial direction".

The inlet (volute tongue) of the scroll part 36 is situated at the angular position θ of 0° in the circumferential direction, as shown in FIG. 2. The angular position θ of 0° in the circumferential direction is defined as the angular position of the distal end of a tongue 41 of the scroll part 36. The tongue 41 is a portion where an outer peripheral wall 42 of the scroll part 36 of the turbine casing 24 and a wall 44 of the inlet part 40 intersect with each other at an acute angle.

The terminating end (volute end) of the scroll part 36 is situated at the angular position θ of 360° in the circumferential direction of the turbine rotor blade 16. The value of the angular position θ increases from the inlet toward the terminating end of the scroll part 36; this value increases along the flow of the fluid in the scroll part 36.

On the other hand, the inner peripheral edge of the scroll part 36 is defined by a virtual circle 48 touching the tongue 41, centered at the axis (rotational axis) of the turbine rotor blade 16. The outer peripheral edge of the scroll part 36 is defined by the outer peripheral wall 42 of the scroll part 36. A flow-path cross-sectional area A of the scroll part 36 is an area of a space defined between the circle 48 and the outer peripheral wall 42 of the scroll part 36.

Figure 3:
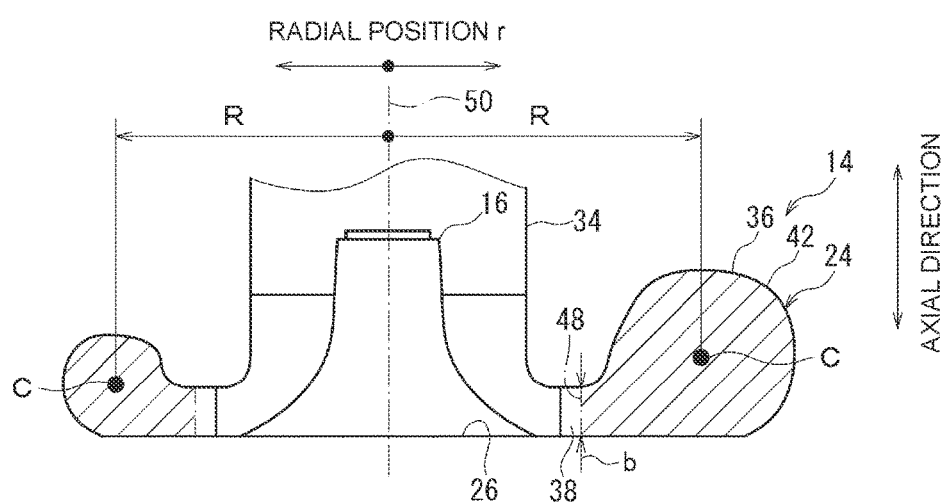
FIG. 3 is a diagram for describing a ratio A/R in a scroll part 36.

FIG. 3 is a diagram for describing a ratio A/R in the scroll part 36. The A/R is a ratio of the flow-path cross-sectional area A to a distance R, where A is a flow-path cross-sectional area of the scroll part 36, and R is a distance from a centroid C of a flow-path cross-section of the scroll part 36 (center of gravity of this flow-path cross-section) to a rotational axis 50 of the turbine rotor blade 16. In FIG. 3, a region corresponding to the flow-path cross-section of the scroll part 36 is hatched.

Figure 4:
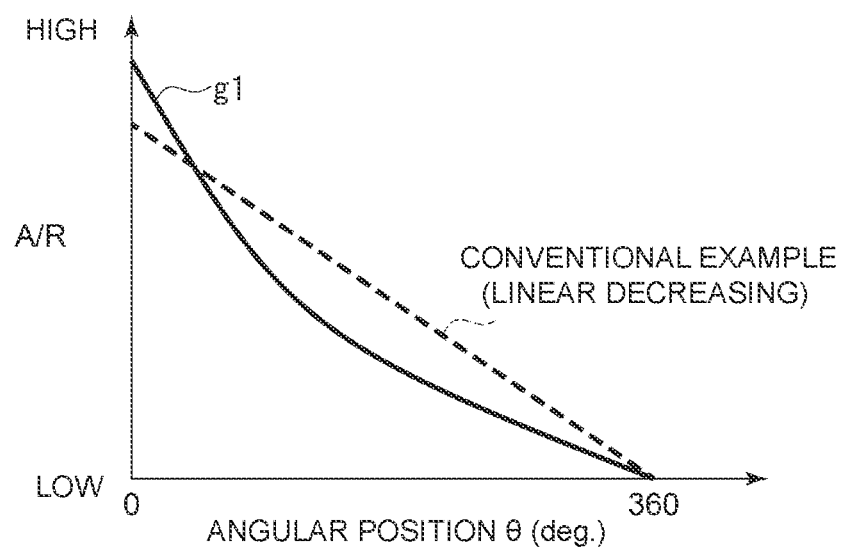
FIG. 4 is a diagram showing a linear decreasing graph according to a conventional example and a first graph g1 which shows a relationship between an angular position $\theta$ in the circumferential direction of the scroll part 36 and a ratio A/R of a flow-path cross-sectional area A to a distance R when the angular position $\theta$ is plotted on the horizontal axis, and the ratio A/R is plotted on the vertical axis.
Figure 5:
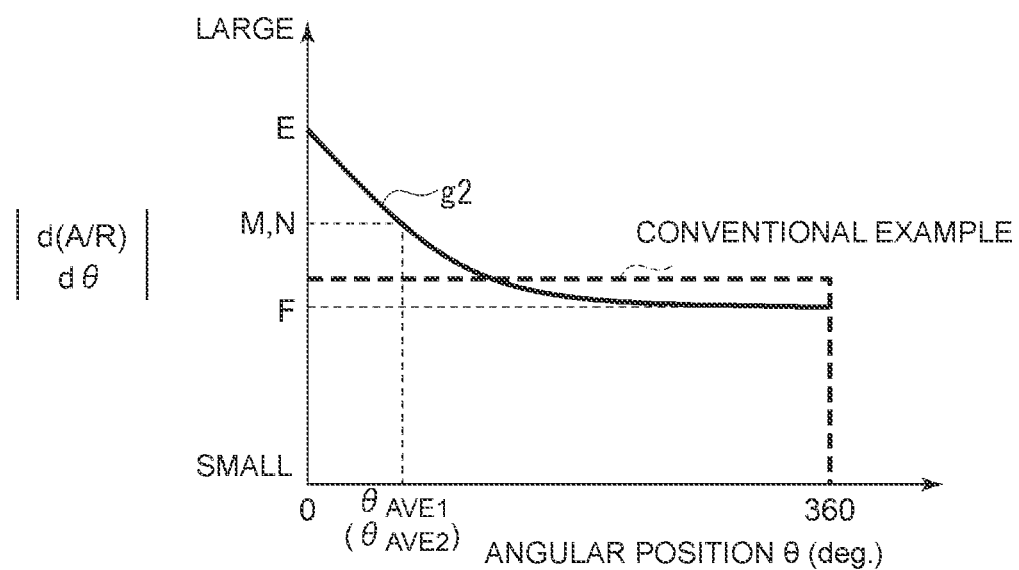
FIG. 5 is a diagram which shows the linear decreasing graph according to the conventional example and a second graph g2 showing a relationship between the angular position $\theta$ in the circumferential direction of the scroll part 36 and an absolute value $|d(A/R)/d\theta|$ of the slope of the first graph G1 shown in FIG. 4 when the angular position $\theta$ is plotted on the horizontal axis, and the absolute value $|d(A/R)/d\theta|$ is plotted on the vertical axis.
Figure 6:
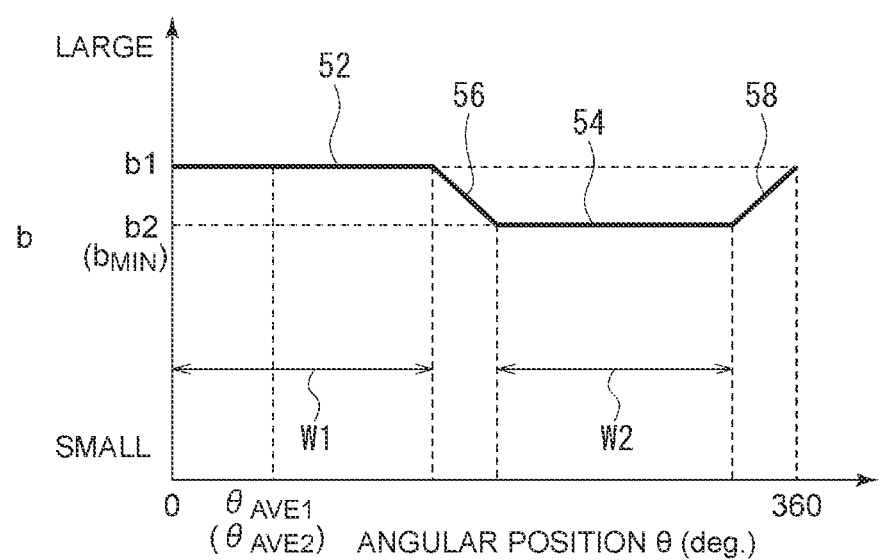
FIG. 6 is a diagram which shows the linear decreasing graph according to the conventional example and a third graph G3 showing a relationship between the angular position $\theta$ in the circumferential direction of the scroll part 36 and a throat width b of the scroll part 36 in the axial direction when the angular position $\theta$ is plotted on the horizontal axis, and the throat width b is plotted on the vertical axis.

FIG. 4 is a diagram showing a linear decreasing graph according to a conventional example and a first graph g1 which shows a relationship between the angular position θ in the circumferential direction of the scroll part 36 and the ratio A/R of the flow-path cross-sectional area A to the distance R when the angular position θ is plotted on the horizontal axis, and the ratio A/R is plotted on the vertical axis. FIG. 5 is a diagram which shows the linear decreasing graph according to the conventional example and a second graph g2 showing a relationship between the angular position θ in the circumferential direction of the scroll part 36 and an absolute value |d(A/R)/dθ| of the slope of the first graph G1 shown in FIG. 4 when the angular position θ is plotted on the horizontal axis, and the absolute value |d(A/R)/dθ| is plotted on the vertical axis. FIG. 6 is a diagram which shows the linear decreasing graph according to the conventional example and a third graph G3 showing a relationship between the angular position θ in the circumferential direction of the scroll part 36 and a throat width b of the scroll part 36 in the axial direction when the angular position θ is plotted on the horizontal axis, and the throat width b is plotted on the vertical axis. The throat width b of the scroll part 36 in the axial direction is, as shown in FIG. 3, a flow path width of the scroll part 36 in the axial direction at the position of the circle 48; this width corresponds to a flow path width of the communication part 38 in the axial direction.

As shown in FIG. 4, the scroll part 36 is configured so that the ratio A/R monotonously decreases downstream (toward the terminating end) in the circumferential direction. Further, the scroll part 36 is configured so that at a least part of the first graph g1 has a concave distribution. That is, the absolute value |d(A/R)/dθ| of the slope of the first graph g1 at the inlet side (volute tongue side) is larger than the absolute value |d(A/R)/dθ| of the slope of the first graph g1 at the terminating end side (volute end side).

With this configuration, it is possible to achieve the turbine with high efficiency considering exhaust pulsation. The mechanism will be described.

Figure 7:
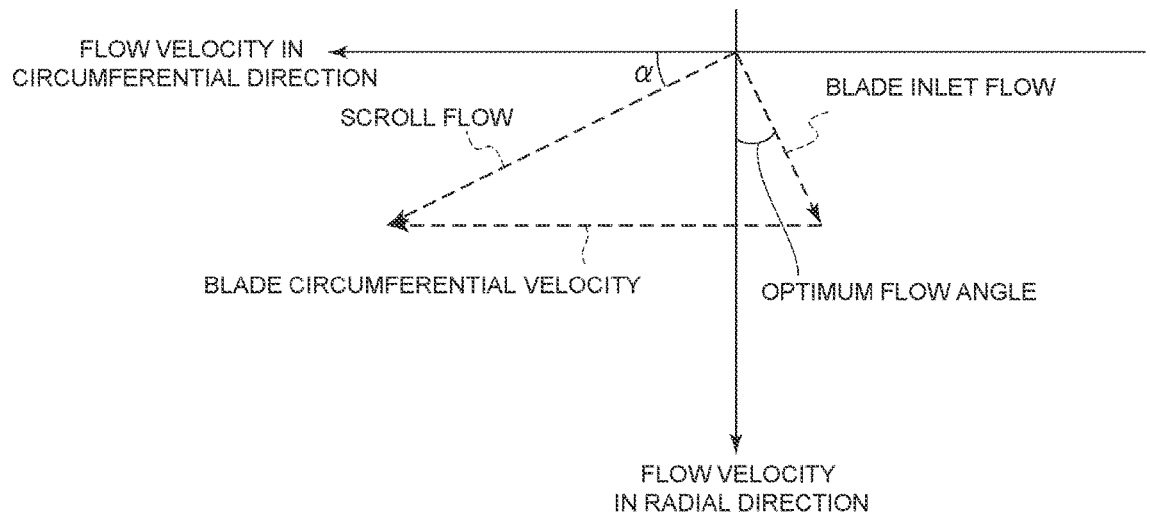
FIG. 7 is a diagram for describing a relationship between a flow velocity vector of the scroll flow, a velocity vector of the circumferential velocity of the rotor blade, and a flow velocity vector of the blade inlet flow, in a state where the blade inlet flow has an optimum flow angle.

FIG. 7 is a diagram for describing a relationship between a flow velocity vector of the scroll flow, a velocity vector of the circumferential velocity of the rotor blade, and a flow velocity vector of the blade inlet flow, in a state where the blade inlet flow has an optimum flow angle. The flow velocity vector of the scroll flow means a flow velocity vector of a flow from the scroll part 36 at the position of the inlet (blade leading edge) of the turbine rotor blade 16. The velocity vector of the blade circumferential velocity means a circumferential velocity vector of the turbine rotor blade 16 at the position of the inlet of the turbine rotor blade 16. The flow velocity vector of the blade inlet flow means a relative velocity vector of the scroll flow with respect to the turbine rotor blade 16 at the position of the inlet of the turbine rotor blade 16. Accordingly, as shown in FIG. 7, the flow velocity vector of the blade inlet flow corresponds to a vector obtained by subtracting the velocity vector of the blade circumferential velocity from the flow velocity vector of the scroll flow.

Figure 8:
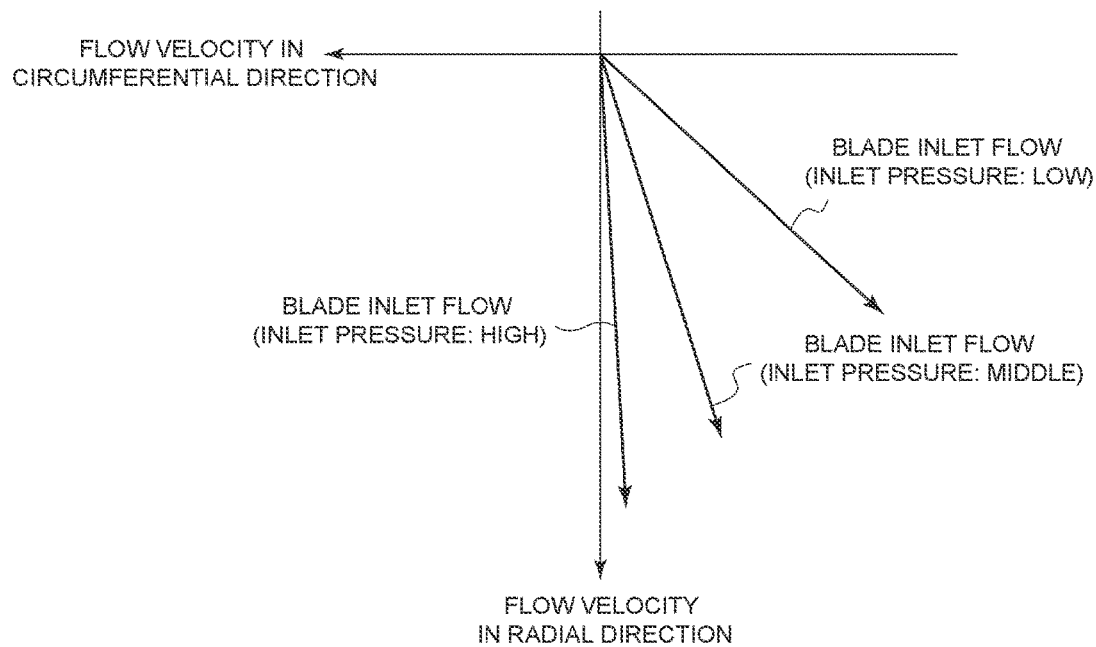
FIG. 8 is a diagram showing a flow velocity vector of the blade inlet flow which changes in accordance with exhaust pulsation.

Here, the magnitude of the flow velocity vector of the scroll flow is changed by exhaust pulsation. That is, the flow velocity vector of the scroll flow increases when the inlet pressure of the turbine rotor blade 16 is temporarily increased by exhaust pulsation; and the flow velocity vector of the scroll flow decreases when the inlet pressure of the turbine rotor blade 16 is temporarily decreased by exhaust pulsation. Accordingly, as shown in FIG. 8, the flow velocity vector of the blade inlet flow is also changed by exhaust pulsation.

On the other hand, the flow-path cross-sectional area A of the scroll part 36 decreases downstream, and thus a wet area per unit flow rate in the flow-path cross-section of the scroll part 36 (a contact area between exhaust gas and a flow path wall surface of the scroll part 36 per unit flow rate) increases downstream. Therefore, it is preferable to collect energy at the inlet side, where exhaust gas has large energy, as much as possible in the scroll part 36 in terms of efficiency.

In view of this, in the turbine 10, the scroll part 36 is configured so that the first graph G1 at least partially has a concave distribution as described above, to effectively collect energy of the scroll flow temporarily increased by exhaust pulsation at the inlet side of the scroll part 36, considering the change in magnitude of energy of exhaust gas by pulsation.

Figure 9:
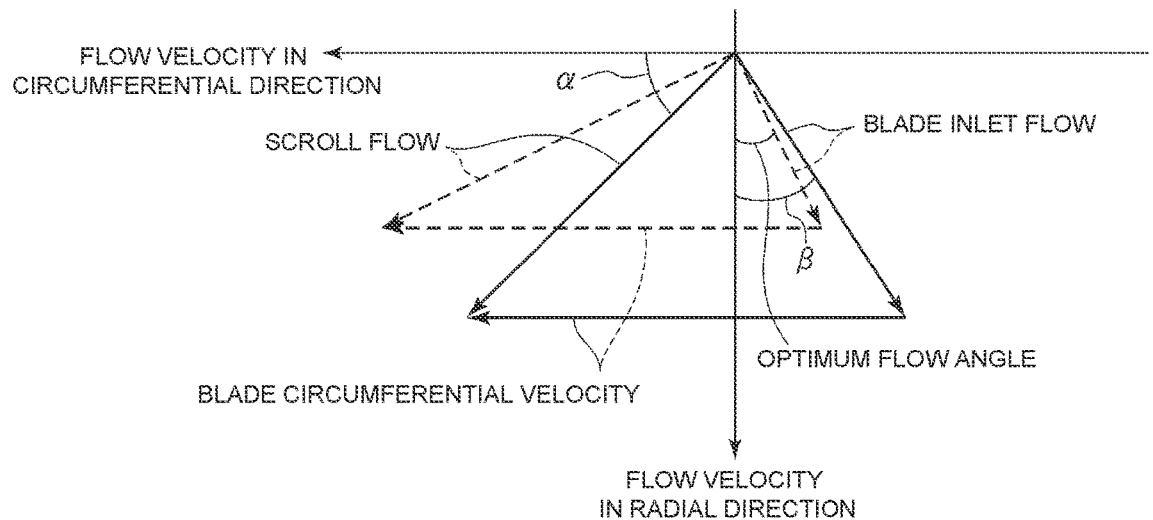
FIG. 9 is a diagram showing an optimum flow angle and an example of the flow angle $\alpha$ of the scroll flow at the inlet side of the scroll part 36.
Figure 10:
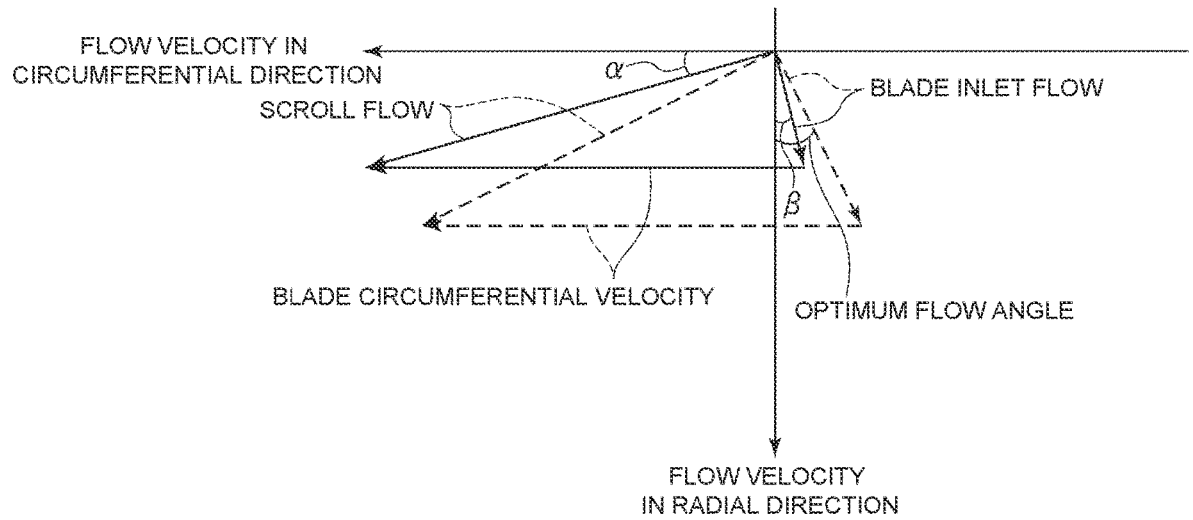
FIG. 10 is a diagram showing an optimum flow angle and an example of the flow angle α of the scroll flow at the outlet side of the scroll part 36.

With this configuration, the absolute value |d(A/R)/dθ| of the slope of the first graph g1 at the inlet side of the scroll part 36 is made larger than the absolute value |d(A/R)/dθ| of the slope of the first graph g1 at the terminating end side of the scroll part 36. Thus, a flow angle α of the scroll flow at the inlet side of the scroll part 36 (an angle of the scroll flow with respect to the circumferential direction, see FIG. 9) can be easily made larger than a flow angle α of the scroll flow at the terminating end side of the scroll part 36 (see FIG. 10). That is, a flow angle β of the blade inlet flow at the inlet side of the scroll part 36 (an angle of the blade inlet flow with respect to the radial direction, see FIG. 9) can be easily made larger than a flow angle β of the blade inlet flow at the terminating end side of the scroll part 36 (see FIG. 10). In FIGS. 9 and 10, the dotted line shows a case where the flow angle of the blade inlet flow is an optimum flow angle.

Figure 11:
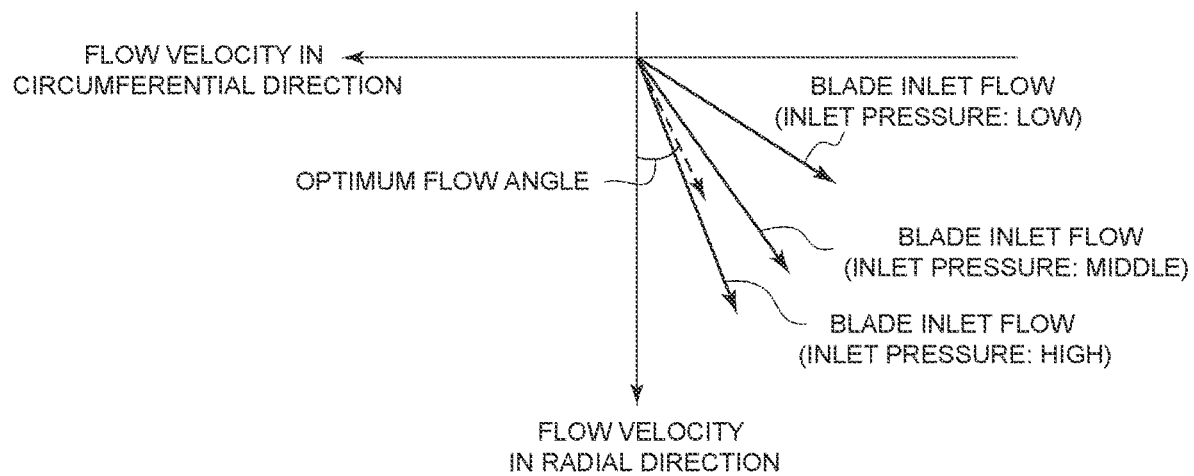
FIG. 11 is a diagram showing an optimum flow angle and an example (working example) of the flow angle of the blade inlet flow at the inlet side of the scroll part 36 in a case where the inlet pressure of the rotor blade is changed by exhaust pulsation.

Consequently, as shown in FIG. 11, the scroll part 36 can be configured so that the flow angle of the blade inlet flow at the inlet side of the scroll part 36 matches or approximates to the optimum flow angle when the inlet pressure of the turbine rotor blade 16 is temporarily increased by exhaust pulsation. Thus, it is possible to effectively collect energy of the scroll flow temporarily increased by exhaust pulsation at the inlet side of the scroll part 36, and it is possible to achieve the turbine with high efficiency considering exhaust pulsation.

Figure 12:
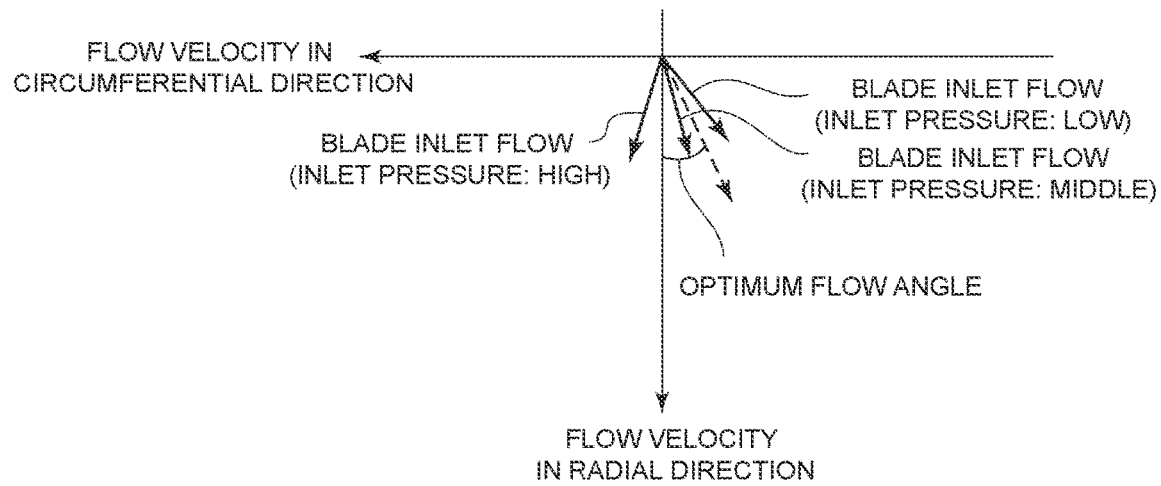
FIG. 12 is a diagram showing an optimum flow angle and an example (comparative example) of the flow angle of the blade inlet flow at the terminating end side of the scroll part 36 in a case where the inlet pressure of the rotor blade is changed by exhaust pulsation.

On the other hand, as shown by the dotted line of FIG. 6, if the throat width b of the scroll part 36 in the axial direction is unintentionally set constant regardless of the circumferential position, as shown in FIG. 12, the flow angle of the blade inlet flow is significantly deviated from the optimum flow angle at the terminating end side of the scroll part 36 when the inlet pressure of the turbine rotor blade 16 is temporarily increased by exhaust pulsation.

Accordingly, the turbine 10 is configured so as to increase energy that can be collected at the terminating end side of the scroll part 36. As illustrated in FIG. 6, the scroll part 36 includes a first section 52 belonging to a first angular range W1 in the circumferential direction and a second section 54 belonging to a second angular range W2 on the downstream side of the first angular range W1 in the circumferential direction. The second section 54 has a smaller throat width b2 than a throat width b1 of the first section 52 in the axial direction.

According to findings of the present inventor, the flow angle $\alpha_r$ of scroll flow is represented by the following expression (a):

$$\alpha = \tan^{-1} \left| \frac{d(A/R)}{d\theta \times b} \right| \quad \text{(a)}$$

wherein b is the throat width of the scroll part 36 in the axial direction.

Figure 13:
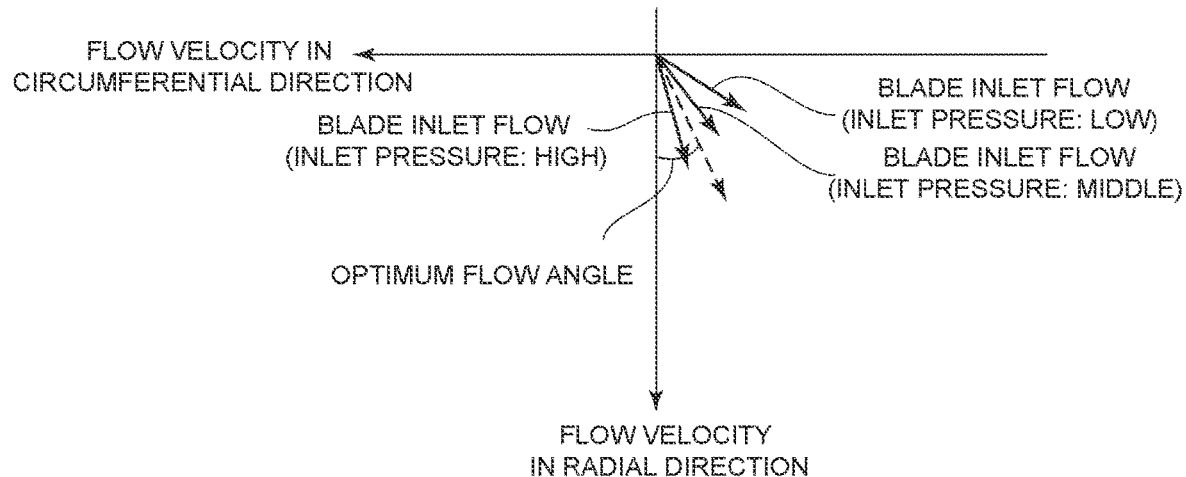
FIG. 13 is a diagram showing an optimum flow angle and an example (working example) of the flow angle of the blade inlet flow at the terminating end side of the scroll part 36 in a case where the inlet pressure of the rotor blade is changed by exhaust pulsation.

Thus, even if the scroll part 36 is configured so that the first graph g1 at least partially has a concave distribution as shown in FIG. 4, it is possible to reduce a reduction in flow angle α of the scroll flow in the second section 54 by decreasing the throat width b2 in the second section 54 at the terminating end side of the scroll part 36. Accordingly, even in the second section 54 at the terminating end side of the scroll part 36, as shown in FIG. 13, the scroll part 36 can be configured so that the flow angle of the blade inlet flow matches or approximates to the optimum flow angle when the inlet pressure of the turbine rotor blade 16 is temporarily increased by exhaust pulsation. Thus, it is possible to achieve the turbine 10 with higher efficiency considering exhaust pulsation.

In some embodiments, as shown in FIG. 5, in the scroll part 36, taking $\theta_{AVE1}$ as an angular position given in the second graph g2 against an average M of a maximum value E and a minimum value F of the absolute value $|d(A/R)/d\theta|$ of the slope of the first graph g1, the scroll part 36 has a minimum value $b_{MIN}$ of the throat width b in the axial direction at an angular position downstream of the angular position $\theta_{AVE1}$ in the circumferential direction, as shown in FIG. 6.

With this configuration, it is possible to set an appropriate flow angle of the scroll flow on the downstream side of the angular position $\theta_{AVE1}$ in the scroll part 36, considering exhaust pulsation. Thus, it is possible to achieve the turbine 10 with higher efficiency.

In some embodiments, as shown in FIG. 5, in the scroll part 36, taking $\theta_{AVE2}$ as an angular position given in the second graph against an average N of the absolute value $|d(A/R)/d\theta|$ of the slope of the first graph g1 at the angular position of 0° and the absolute value $|d(A/R)/d\theta|$ of the slope of the first graph g1 at the angular position of 360°, the scroll part 36 has a minimum value $b_{MIN}$ of the throat width b in the axial direction at an angular position downstream of the angular position $\theta_{AVE2}$ in the circumferential direction, as shown in FIG. 6. In the depicted illustrative embodiment, N=M, $\theta_{AVE1}=\theta_{AVE2}$, and $b_{MIN}=b2$ are satisfied.

With this configuration, it is possible to set an appropriate flow angle of the scroll flow on the downstream side of the angular position $\theta_{AVE2}$ in the scroll part 36, considering exhaust pulsation. Thus, it is possible to achieve the turbine 10 with higher efficiency.

In the illustrative embodiment shown in FIG. 6, the throat width b1 in the axial direction at the first section 52 of the scroll part 36 and the throat width b2 in the axial direction at the second section 54 of the scroll part 36 are each kept constant. Further, the scroll part 36 includes a third section 56 connecting the first section 52 and the second section 54 and configured to decrease the throat width b in the axial direction toward the downstream side in the circumferential direction, and a forth section 58 connected to the downstream side of the second section 54 and configured to increase the throat width b in the axial direction toward the downstream side in the circumferential direction so as to be connected to the distal end of the tongue 41.

With this configuration, it is possible to set an appropriate flow angle of the scroll flow without forming a step on a flow path wall surface of the scroll part 36, considering exhaust pulsation. Thus, it is possible to achieve the turbine with high efficiency.

Embodiments of the present invention were described in detail above, but the present invention is not limited thereto, and various amendments and modifications may be implemented.

For instance, while the embodiment shown in FIG. 6 shows a case where the throat width b1 in the axial direction at the first section 52 and the throat width b2 in the axial direction at the second section 54 are each kept constant, the throat width in the axial direction at the first section 52 and the throat width in the axial direction at the second section 54 may separately vary with the angular position θ in the circumferential direction.

REFERENCE SIGNS LIST

10 Turbine
12 Compressor
14 Turbine housing
16 Turbine rotor blade
18 Compressor housing
20 Impeller
22 Shaft
24 Turbine casing
26, 32 End wall
28 Bearing housing
30 Compressor casing
34 Shroud part
36 Scroll part
38 Communication part
40 Inlet part
41 Tongue
42 Outer peripheral wall
44 Wall
48 Circle
50 Rotational axis
52 First section
54 Second section
56 Third section
58 Forth section
100 Variable-displacement turbocharger

The invention claimed is:
1. A turbine comprising:
a turbine rotor blade; and
a turbine housing accommodating the turbine rotor blade;
the turbine housing including
a shroud part accommodating the turbine rotor blade,
a scroll part formed on a radially outer side of the turbine rotor blade, and
a communication part connecting the scroll part and the shroud part,
wherein when A is a flow-path cross-sectional area of the scroll part, and R is a distance from a centroid of a flow-path cross-section of the scroll part to a rotational axis of the turbine rotor blade,
the scroll part is configured so that a first graph at least partially has a concave distribution, the first graph having a horizontal axis representing an angular position θ in a circumferential direction of the scroll part and a vertical axis representing a ratio A/R of the flow-path cross-sectional area A to the distance R,
wherein the scroll part includes
a first section belonging to a first angular range in the circumferential direction, and
a second section belonging to a second angular range downstream of the first angular range in the circumferential direction, the second section having a smaller throat width than a throat width of the first section in an axial direction of the turbine rotor blade, and wherein the first section at an inlet side has a larger absolute value $|d(A/R)/d\theta|$ of a slope of the first graph than that of the second section at a terminating end side.

2. The turbine according to claim 1,
wherein the scroll part has a minimum throat width in the axial direction at an angular position downstream of an angular position $\theta_{AVE1}$ in the circumferential direction,
where the angular position $\theta_{AVE1}$ is plotted in a second graph, having a horizontal axis representing an angular position $\theta$ in the circumferential direction of the scroll part and a vertical axis representing an absolute value $|d(A/R)/d\theta|$ of a slope of the first graph, against an average of a maximum value and a minimum value of the absolute value $|d(A/R)/d\theta|$.

3. The turbine according to claim 1,
wherein the scroll part has a minimum throat width in the axial direction at an angular position downstream of an angular position $\theta_{AVE2}$ in the circumferential direction,
where the angular position $\theta_{AVE2}$ is plotted in a second graph, having a horizontal axis representing an angular position $\theta$ in the circumferential direction of the scroll part and a vertical axis representing an absolute value $|d(A/R)/d\theta|$ of a slope of the first graph, against an average of the absolute value $|d(A/R)/d\theta|$ of the slope of the first graph at the angular position $\theta$ of 0° and the absolute value $|d(A/R)/d\theta|$ of the slope of the first graph at the angular position of 360°.

4. The turbine according to claim 1,
wherein the scroll part includes a section configured to decrease a throat width in the axial direction toward a downstream side in the circumferential direction.

5. A turbocharger comprising a turbine according to claim 1.

* * * * *